United States Patent [19]

Frantom et al.

[11] Patent Number: 4,655,312

[45] Date of Patent: Apr. 7, 1987

[54] ELECTRICALLY ADJUSTED SAFETY RESTRAINT SYSTEM

[75] Inventors: Richard L. Frantom, Richmond; William R. Seitz, Birmingham; Walter F. Datwyler, Jr., Royal Oak, all of Mich.

[73] Assignee: Allied Corporation, Morris Township, Morris County, N.J.

[21] Appl. No.: 787,298

[22] Filed: Oct. 15, 1985

[51] Int. Cl.[4] .......................................... B60R 21/10
[52] U.S. Cl. ................................. 180/268; 280/807
[58] Field of Search ............... 180/268; 280/801, 806, 280/807, 808; 242/107.6, 107.7

[56] References Cited

U.S. PATENT DOCUMENTS

| | | | |
|---|---|---|---|
| 4,478,433 | 10/1984 | Taguchi et al. | 180/268 |
| 4,511,097 | 4/1985 | Tsuge et al. | 280/808 |
| 4,529,143 | 7/1985 | Kanada et al. | 280/807 |
| 4,534,441 | 8/1985 | Kamijo et al. | 280/806 |
| 4,588,144 | 5/1986 | Nishimura | 280/807 |

*Primary Examiner*—John J. Love
*Assistant Examiner*—Ross Weaver

*Attorney, Agent, or Firm*—Russel C. Wells; Markell Seitzman

[57] ABSTRACT

A safety restraint system having a seat belt retractor actuated by an electric motor, a logic control responsive to the state of a buckle switch and the outputs of a motor current sensor, a motor terminal voltage sensor and a crash sensor for generating mode signals corresponding to the operational state of the system, and a motor power control responsive to the mode signals for adjusting the seat belt for optimum safety of the occupant. When the seat belt is buckled the logic control will sequentially generate signals activating the power control to energize the retractor's motor to snug up the seat belt against the occupant's shoulder, then reverse its direction to provide a predetermined slack. The crash sensor will cause the motor to be energized to remove most of the slack before the crash loads are imposed upon the seat belt and the retractor. Unbuckling the seat belt energized the motor to stow the seat belt. The system is also responsive to movements of the occupant beyond the limits of the provided slack which increase the seat belt's slack. Upon the detection of such movements, the system will after a predetermined delay return the seat belt to its initial adjusted state.

28 Claims, 11 Drawing Figures

ELECTRICALLY ADJUSTED SAFETY RESTRAINT SYSTEM

BACKGROUND OF THE INVENTION

1. Field of the Invention

The invention is related to automotive safety restraint systems and, in particular, a safety restraint system having a seat belt retractor driven by an electric motor for adjusting the seat belt about the operator.

2. Background of the Invention

The safety of the occupant of an automotive vehicle during a crash depends upon whether or not he or she is using a safety restraint system, and, if they are using one, is it properly adjusted. All to often, the occupant is wearing a safety restraint system, but it is not adjusted properly, reducing the effectiveness of the restraint system to prevent injury to the occupant.

Current three point safety restraint systems have a seat belt retractor which takes-up the slack in the seat belt after it is buckled up. These retractors normally have a spring motor exerting a torque tending to wind up the seat belt on the retractor's take-up spool. Unfortunately this torque snugs up the shoulder portion of the seat belt and maintains a constant pressure against the occupant's shoulder. For most people, this constant pressure on his or her shoulder is uncomfortable and annoying and therefore they tend not to use the safety restraint system. To eliminate this problem, the prior art teaches placing an adjustable stop on the seat belt which engages the shoulder guide to control the slack in the seat belt when it is snugged up by the retractor. Alternatively, the prior art teaches a tension eliminator built into the retractor which is capable of locking up the retractor's take-up spool to prevent the seat belt from exerting an uncomfortable force on the occupant's shoulder. These tension eliminators are normally set by pulling out a small amount of the seat belt setting a catch then letting the spring motor rewind the seat belt until the take-up spool locks up preventing further retraction of the seat belt.

The problem with the adjustable stop on the seat belt is that it has to be manually adjusted for each occupant. The adjustable stop is difficult to adjust, therefore it is frequently adjusted for the largest occupant and not changed thereafter. This provides excessive slack in the shoulder portion of the seat belt when worn by a smaller occupant and reduces the effectiveness of the safety restraint system. In a like manner, the tension eliminator is frequently set too loosely for the optimum effectiveness of the safety restraint system.

The invention is a safety restraint system in which the retractor is driven by an electric motor to properly adjust the seat belt for optimum protection of the occupant.

SUMMARY OF THE INVENTION

The invention is a safety restraint system for restraining an occupant in a vehicle's seat during a crash. The safety restraint system comprises a seat belt having one end connected to a structural member of the vehicle along side of the vehicle's seat, the other end attached to a seat belt retractor, and lock means for inhibiting the extraction of the seat belt from the retractor in the event of a crash. The improvement to the safety restraint system is characterized by an electric motor for actuating the retractor to retract the seat belt, switch means associated with the seat belt having a first state signifying that the seat belt is secured about the seat's occupant and a second state signifying that the seat belt is not secured about the occupant; means for generating a snugged-up signal signifying the seat belt has been snugged up to the occupant with a predetermined force; logic means for generating at least a first control signal in response to the state of said switch means and for terminating said first control signal in response to said snugged-up signal and motor power control means for providing electrical power to said motor in response to said first control signal energizing said motor to actuate the retractor to snug up the seat belt to the occupant when the switch means is in said first state and to stow the seat belt when the switch means is in said second state.

In the preferred embodiment the logic control will also produce a second signal in response to the end of said first signal operative to cause said control means to energize the motor to run in a reverse direction providing a predetermined slack in the seat belt making it more comfortable for the occupant.

One advantage of the seat belt system is that the seat belt is properly adjusted providing optimum safety to the occupant. Another advantage is that the electric motor is capable of taking up most of the seat belt's slack under crash conditions before the crash loads are applied to the seat belt. These and other advantages of the safety restraint system will become more apparent from a reading of the specification in conjunction with the drawings.

A BRIEF DESCRIPTION OF THE FIGURES

DETAILED DESCRIPTION OF THE INVENTION

Figure 1:
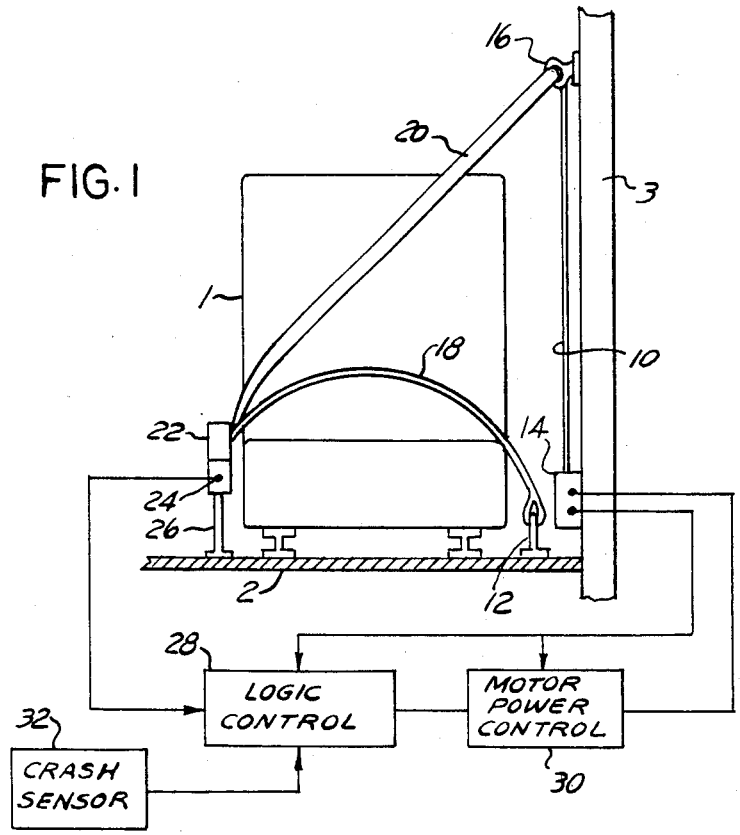
FIG. 1 is a front view of the safety restraint system.

Although the electrically adjusted safety restraint system will be described with reference to a continuous loop three point safety restraint system having a single seat belt retractor, the concepts are equally applicable to three point safety restraint systems having dual retractors, to two point safety restraint systems having only a lap belt or a shoulder belt or to passive safety restraint systems currently under development. It is not intended that the invention be limited to the specific embodiment described herein and illustrated in the drawings but rather is applicable to any type of safety restraint system known in the art. Referring to FIG. 1, there is shown the basic components of a continuous loop three point electrically adjusted safety restraint system in conjunction with a passenger seat 1 of an automotive vehicle. The seat 1 is attached to the vehicle's floor 2 in a conventional manner.

Adjacent to the seat 1 is a side pillar 3 or comparable structural member of the vehicle to which a shoulder portion of the three point safety restraint system is attached.

A seat belt 10 has one end connected to an anchor bracket 12 which, as shown is attached to the vehicle's floor 2 or, as is known in the art, to the frame of seat 1. The opposite end of the seat belt 10 is connected to a motor driven seat belt retractor 14 attached to the pillar 3. As is known in the art, the retractor 14 may alternatively be mounted on the roof or floor of the vehicle, in the door, or at a remote location. The motor driven seat belt retractor 14 may be of any conventional design in which the spring motor is replaced by a reversible electric motor to effect winding the seat belt 10 on a take-up spool. The retractor 14 does not require a tension eliminator normally associated with three point seat belt systems as will become evident from the detailed description of the safety restraint system.

The seat belt 10 from the motor driven retractor 14 is entrained through a web guide 16 attached to the pillar 3 at approximately the shoulder height of the seat's occupant in a conventional manner. The remainder of the seat belt 10 between the web guide 16 and the floor mounted bracket 12 is divided into a lap portion 18 and a shoulder portion 20 by an adjustable tongue 22. The adjustable tongue 22 is received in a buckle 24 attached to the vehicle's floor or to a structural member of the vehicle's seat by means of a semi-rigid buckle support 26 on the side of the seat opposite anchor bracket 12. The buckle 24 includes means, such as electrical switch 38 (FIG. 2) for generating a signal signifying the occupant has deployed the safety restraint system and latched the adjustable tongue 22 in buckel 24. The state of the buckle's electrical switch 38 being indicative of whether or not the safety restraint system is secured about the seat's occupant.

A Logic Control 28 responsive to the state of the buckle switch 38 signifying that the adjustable tongue 22 is latched in the buckle 24, will activate the motor driven seat belt retractor 14 through a Motor Power Control circuit 30 to retract the seat belt until the shoulder portion 20 of the seat belt 10 is pulled snugly against the occupant's shoulder. The Logic Control 28 senses when the seat belt is snugged up with a predetermined force and terminates retraction of the seat belt 10. The Logic Control 28 then activates the Motor Power Control 30 to reverse the direction of the retractor's motor to pay out a small predetermined length of the seat belt 10. This will relax the shoulder portion 20 of the seat belt removing the pressure exerted on the occupant's shoulder and result in the occupant feeling unincumbered by the safety restraint system. The Logic Control 28 will also sense when the seat belt is manually extracted from the motor driven retractor 14 by the occupant bending forward or changing his position beyond the limits of the seat belt's relaxed state. When this happens the Logic Control 28, after a predetermined delay, will activate the motor driven retractor 14 to retract the seat belt again until it is snugged up against the occupants shoulder, then reverse its direction, as before, to provide a predetermined amount of slack in the seat belt's shoulder portion 20.

The Logic Control 28 is also responsive to a crash sensor 32 to activate the Motor Power Control 30 to energize the motor driven retractor 14, to take-up the slack in the seat belt 10 before the crash loads are applied to the seat belt by the occupant. The crash sensor may be an inertia activated switch or a simple radar system which anticipates a crash from distance and/or rate of closure signals. Even with an inertia switch it is possible to take up the seat belt's slack because there is a 15 to 20 millisecond delay between the detection of the crash condition by the inertia switch and the crash load build up on the safety restraint system. In this 15 to 20 milliseconds interval the motor 42 is capable of retracting 5 to 10 centimeters of the slack before the crash loads are applied to the seat belt by the occupant.

Finally, the Logic Control 28 is responsive to the unbuckling of buckle 24 to actuate the Motor Power Control 30 to energize the motor to retract the seat belt to its stowed position. This eliminates the need for a special sensor to activate the retractor to stow the seat belt in response to opening the vehicle's door.

Figure 2:
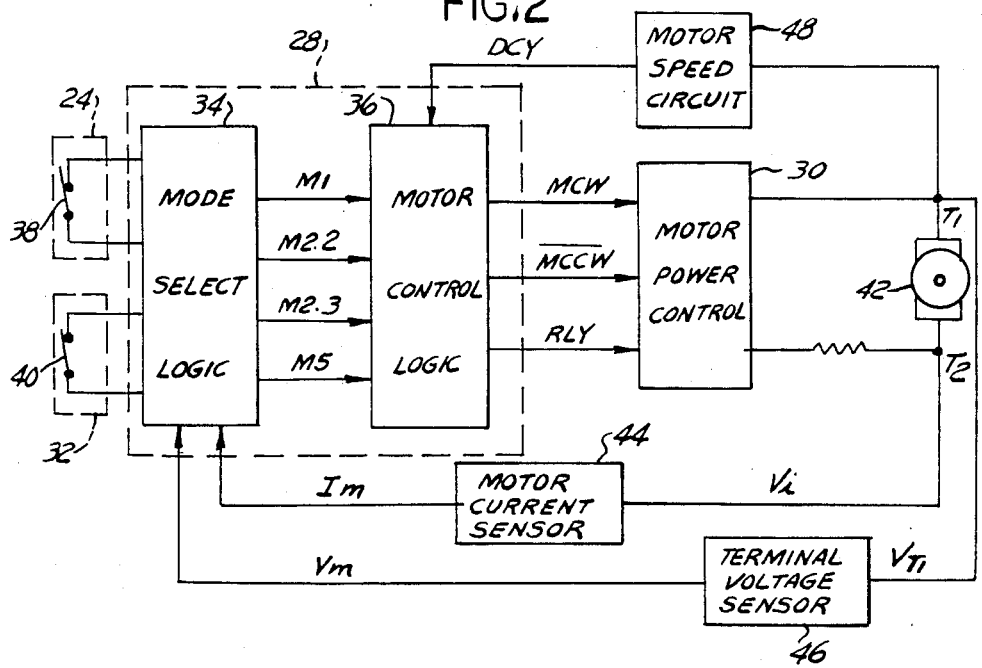
FIG. 2 is a block diagram showing the details of electrical control portion of the safety restraint system.

FIG. 2 is a more detailed block diagram of the electrical portion of the safety restraint system of FIG. 1. The Logic Control 28 comprises a mode select logic circuit 34 and a motor control logic circuit 36. The mode select logic circuit 34 receives four separate inputs indicative of different parameters which dictate the safety restraint system's mode of operation. The first input is a signal indicative that the safety restraint system is deployed and secured about the occupant. In the illustrative embodiment, this signal is the state of the buckle switch 38. Buckle switch 38 is normally closed, as shown, and is opened when the adjustable tongue 22 is latched in the buckle 24. The second input is from the vehicle mounted crash sensor 32 illustrated as a normally closed switch 40. Switch 40 is normally closed and will open in response to an acceleration or deceleration of the vehicle exceeding a predetermined value in the range from 0.6 to 1.0 g's. The third input is a signal indicating that the seat belt is exerting a predetermined force on the occupant's shoulder. In the illustrated embodiment this signal is a motor current signal (Im) signifying that value of the electrical current being supplied to the retractor's motor 42 is greater than a predetermined value. The fourth input is a signal indicating that there is excessive slack in the seat belt. In the illustrated embodiment this signal is a motor voltage or manual extraction signal (Vm) signifying that a length of seat belt has been manually extracted from the retractor. This motor voltage is generated across the terminals of the retractor's motor 42 when the motor is manually rotated by the extraction of the seat belt from the retractor. The signals Im and Vm are generated by a motor current sensor 44 and terminal voltage sensor 46 respectively. Alternatively the tension and slack of the seat belt may be detected by separate sensors directly measuring the tension on the seat belt and the occurance of an excessive slack condition repsectively rather than the indirect methods employed in the illustrated embodiment.

The mode select logic circuit 34, in response to these four inputs, will generate five different mode signals three of which are applied to the motor control logic 36. The motor control logic 36, in turn, will generate the signals CW, CCW and RLY which are applied to the Motor Power Control 30 and control the rotational direction and speed of the retractor's motor 42.

The Motor Power Control 30 will respond to these input signals and provide electrical power to the motor 42 as required. In the illustrated embodiment the motor will cause the seat belt to be retracted or stowed when the motor turns in the clockwise (CW) direction, and to pay out or unreel a portion of the seat belt when the motor turns in the counter-clockwise (CCW) direction.

The retractor's motor 42 may be a two speed motor having two separate inputs or alternatively a single speed motor operated at two different power levels. For example, motor 42 may receive electrical power at a 50% duty cycle or half power from the Motor Power Control 30 for slow speed operation and at a 100% duty cycle or full power for high speed operation. As shall be explained hereinafter, the high speed operation of motor 42 is only required upon the sensing of a crash condition and is only applied for a very brief period of time, so as not to damage the motor.

The five operational modes generated by the mode select logic 34 are as follows:

Mode 1. The function of Mode 1 is to activate the retractor's motor 42 to snug up or to stow the seat belt. This mode is initiated by (a) the opening or closing of the buckle switch 38, (b) the end of Mode 3, or (c) the end of Mode 4. Mode 1 is terminated by either the snugged-up or current signal Im or the end of a first predetermined time.

Mode 2. The function of Mode 2 is to pay out a predetermined length of seat belt from retractor 14 after it was snugged up by Mode 1. Mode 2 is initiated by the end of Mode 1 and terminates after a second predetermined time. Mode 2 has three sub-modes M2.1, M2.2 and M2.3. Sub-mode M2.1 is a delay to allow the transient motor current to decay before reversing the motor 42. Sub-mode M2.2 is a second delay to allow a power control relay to be reversed before applying electrical power to the motor 42 in the reversed direction. This second delay prevents arcing at the relay contacts and minimizes contact wear. Sub-mode M2.3 activates the motor power control to apply electrical power to the retractor's motor 42 in the reversed direction to pay out approximately 2.5 centimeters of the seat belt from the retractor 14.

Mode 3. The function of Mode 3 is to resnug the seat belt after it has been loosened by the occupant moving beyond the limits of the slack provided by Mode 2. Occupant movements, such as reaching to adjust the radio, extinguishing a cigarette or reaching for something in the glove compartment, will cause the seat belt to have excessive slack which must be removed if the safety restraint system is to be effective during a crash. Mode 3 is initiated by the seat belt switch 38 being open, the occurence of the voltage signal Vm and the mode select logic circuit 34 not being in any other mode. Mode 3 is terminated after a third predetermined period of time, and initiates Mode 1 to resnug the seat belt.

Mode 4. The function of Mode 4 is to stow the seat belt after an aborted attempt by the occupant to buckle-up. This mode is initiated by the occurence of the voltage signal Vm with the buckle switch 38 being closed indicating that the adjustable tongue is not latched in the buckle. The voltage signal Vm is indicative of the voltage across the terminals of motor 42 exceeding a predetermined value in reponse to the seat's occupant manually extracting the seat belt 10 from retractor 14 to buckle up. When the seat belt is manually extracted from the retractor 14 by the seat's occupant, the motor 42 acts as a tachometer or electrical generator whose output voltage is proportional to the rate at which the seat belt 10 is extracted. Mode 4 is terminated at the end of a fourth time period. The termination of Mode 4 will also initiate Mode 1 to store the seat belt.

Mode 5. The function of Mode 5 is to remove the slack in the seat belt prior to crash loads being applied to the safety restraint system. This mode is initiated by the open state of crash sensor switch 40 and is terminated after a short period of time on the order of 30 to 50 milliseconds. Mode 5 has the highest priority and will override any other mode of operation. Mode 1 has the second highest priority and will override any of the other modes.

Figures 3, 4:
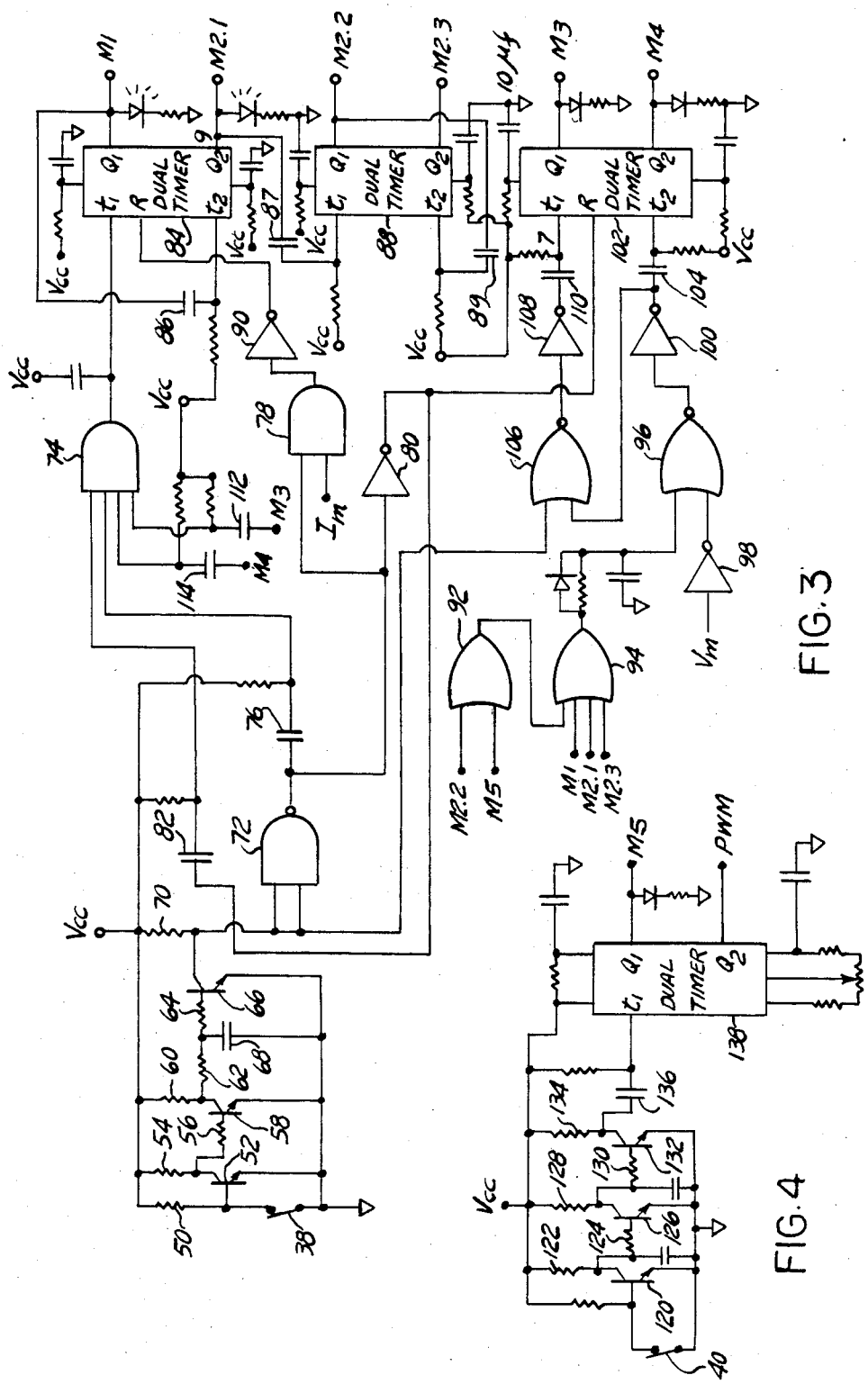
FIGS. 3 and 4 are circuit diagrams of the mode select logic.

The details of the mode select logic 34 for Modes 1,2,3, and 4 are shown in FIG. 3 while the details of the mode select logic for Mode 5 are shown in FIG. 4. The mode select logic 34 receives electrical power from a regulated 5 volt source 280 (shown on FIG. 9) at the terminals designated Vcc. Referring first to FIG. 3, the buckle switch 38 is connected between Vcc and ground via resistance 50. The junction between switch 38 and resistance 50 is connected to the base of a first transistor 52 having its collector connected to Vcc through resistance 54 and its emitter connected to ground. The collector of first transistor 52 is connected to the base to a second transistor 58 via resistance 56. The emitter of second transistor 58 is connected to ground while its collector is connected to Vcc through resistance 60 and to the base of a third transistor 66 through serially connected resistances 62 and 64. The junction between resistances 62 and 64 is connected to ground through capacitor 68. The emitter of transistor 66 is connected to ground while its collector is connected to Vcc through resistance 70. The collector of transistor 66 is also connected to both inputs of NAND gate 72, which functions as an inverter, and to one input of NOR gate 106.

The output of NAND gate 72 is connected to a first input of AND gate 74 through capacitance 76, to one input of AND gate 78, and the input of inverter 80. The output of inverter 80 is connected to a second input of AND gate 74 through capacitance 82 and to the reset input of a third dual timer 102.

The output of AND gate 74 is connected to a first trigger input $t_1$ of the first timer section of dual timer 84 and initiates the generation of the mode signal M1 at its output $Q_1$. The output $Q_1$ is connected to the trigger input $t_2$ of the second timer section of dual timer 84 through capacitor 86 which generates the mode signal M2.1 at its output $Q_2$. The output Q2 of the second timer of dual timer 84 is connected to the first trigger input $t_1$ of a first timer of a second dual timer 88 through capacitor 87. The first timer of dual timer 88 generates the model signal M2.2 at its output $Q_1$. The output $Q_1$ of dual timer 88 is connected to the trigger input $t_2$ of second timer of dual timer 88 through capacitor 89. The second timer section of dual timer 88 generates the mode signal M2.3 at its output $Q_2$.

The second input to AND gate 78 is the motor current signal $I_m$ which is indicative of the motor current having a value greater than a predetermined value. The output of AND gate 78 is connected to the reset input of the first timer of dual timer 84 through inverter 90 and is operative to terminate the mode signal M1 when the motor current exceeds the predetermined threshold value indicating that the shoulder portion of the seat belt has been snugged up against the occupant's shoulder.

OR gate 92 receives the mode signal M2.2 generated at the output $Q_1$ of the first timer of dual timer 88 and the mode signal M5 from the output $Q_1$ of dual timer 138 shown in FIG. 4. The output of OR gate 92 is connected to one input of OR gate 94 which also receives as inputs the mode signals M1 and M2.1 from dual timer 84 and mode signal M2.3 from dual timer 88. The output of OR gate 94 is received at one input of a NOR gate 96. The alternate input to NOR gate 96 is the voltage signal Vm inverted by inverter 98. The output of NOR gate 96 is inverted by inverter 100. The output of inverter 100 is connected to the trigger input of a second timer of a third dual timer 102 through capacitance 104 and to the other input to NOR gate 106. The output of NOR gate 106 is connected to the trigger input $t_1$ of the first timer of dual timer 102 through inverter 108 and capacitance 110. The first timer of dual timer 102 generates the mode signal M3 at its first output $Q_1$ which is applied to an input of AND gate 74 through capacitance 112. The second timer of dual timer 102 generates the mode signal M4 which is applied to an another input of AND gate 74 through capacitance 114. Dual timers 84, 88 and 102 are commercially available elements such as dual timer LM556 manufactured by National Semiconductor.

The operation of the portion of the Mode Select Logic shown on FIG. 3 is as follows: Upon the latching of the adjustable tongue 22 in buckle 24, buckle switch 38 opens rendering transistors 52 and 66 conductive. The conductance of transistor 66 causes the output of NAND gate 72 to become positive and the output of inverter 80 to become negative. The negative output of inverter 80 triggers the first timer of dual timer 84 initiating the beginning of mode signal M1 and will reset the first timer of dual timer 102. The first timer of dual timer 84 will continue to generate the mode signal $M_1$ until it times out or until the seat belt is snugged up against the occupant which causes the retractor's motor to approach a stall condition. When motor 42 starts to stall its current increases above a predetermined threshold which causes the motor current sensor 44 to generate th current signal $I_m$ which is applied to the second input to AND gate 78. AND gate 78 will generate a positive signal when the adjust tongue is latched in the buckle (i.e., when switch 38 is open) and the current signal $I_m$ are present. A positive output from AND gate 78 inverted by inverter 90 will reset the first timer of dual timer 84 to terminate the generation of the mode signal M1.

The termination of the mode signal M1 will trigger the second timer of dual timer 84 to generate the mode signal M2.1 The termination of the mode signal M2.1 triggers the first timer of dual timer 88 to generate the mode signal M2.2. In a like manner, the termination of the mode signal M2.2 triggers the second timer of dual timer 88 to generate the mode signal M2.3 which will cause the motor to be driven in the reverse direction to produce the desires slack in the seat belt.

In the event that the occupant moves so as to pull or extract an additional length of seat belt from the retractor 14, the motor 42 will be manually driven and will act as a tachometer producing an electrical signal. When this signal exceeds a predetermined threshold value, the terminal voltage sensor 46 will generate the voltage signal Vm as shall be explained hereinafter. The voltage signal Vm is inverted and applied to one input to NOR gate 96. Provided that the mode select logic is in no other state, OR gates 92 and 94 will produce a negative signal at the input of NAND gate 96. NOR gate 96 gate will produce a positive output signal which is inverted by inverter 100. The transition of inverter 100 to a negative output will trigger the second timer of dual timer 102 to produce the mode signal M4. Termination of the mode signal M4 will trigger the first timer of dual timer 84 through AND gate 74 and will initiate the generation of the mode signal M1 which will cause the seat belt to be snugged.

The negative output of inverter 100 is also applied to an input of NOR gate 106. If the buckle switch 38 is open indicating the adjustable tongue 22 has been inserted into the buckle 24, transistor 66 is conductive, and applies a negative signal to the other input of NOR gate 106. This circuit condition in which negative signals are applied to both inputs of NOR gate 106, represents the state in which the seat belt is buckled and the occupant has moved beyond the limits of the predetermined slack played out by the retractor. This causes the output of NOR gate 106 to go positive. This positive signal is inverted by inverter 108 triggering the first timer of dual timer 102 to generate mode signal M3. Mode signal M3 will be terminated when the first timer of dual timer 102 times out or when the adjustable tongue 22 is inserted into buckle 24 opening buckle switch 38. This will cause the output of inverter 80 to go low resetting the first timer of dual timer 102. The termination of the mode signal M3 will trigger the first timer of dual timer 84 to generate the mode signal M1.

Unlatching the adjustable tongue 22 from the buckle 24 will close the buckle switch 38 rendering transistors 52 and 66 nonconductive as previously described and cause the output of NAND gate 72 to go low. The transition of the output of NAND gate 72 from high to low will trigger the first timer of dual timer 84 to generate the mode signal M1.

Referring now to FIG. 4 the crash sensor switch 40 is connected between the base and emitter of a first transistor 120. The collector of transistor 120 is connected to Vcc through resistance 122 and to the base of a second transistor 126 through resistance 124. The emitter of transistor 126 is connected to ground while its collector is connected to Vcc through resistance 128 and to the base of transistor 132 through resistance 130. The emitter of transistor 132 is connected to ground while its collector is connected to Vcc through resistance 134 and to the trigger $t_1$ of the first timer of a dual timer 138 through capacitance 136. The output $Q_1$ of the first timer of dual timer 138 is the mode signal M5 which is received at an input of OR gate 92 in FIG. 3 and OR gates 160 and 180 of FIG. 7.

The second timer of dual timer 138 is connected as an oscillator to generate at its output $Q_2$ a pulse width modulation (PWM) signal at a 1 kHz frequency. This 1 kHz pulse width modulation signal is applied to an input of OR gate 166 of FIG. 7 to modulate the not counterclockwise ($\overline{CCW}$) signal generated by the motor control logic 36.

Figure 5:
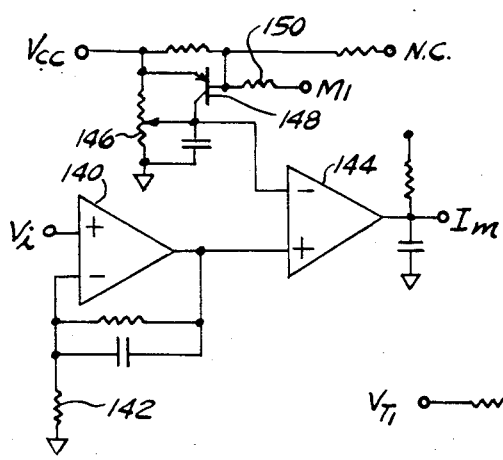
FIGS. 5 and 6 are circuit diagrams of the motor current sensor and terminal voltage sensor respectively.
Figure 9:
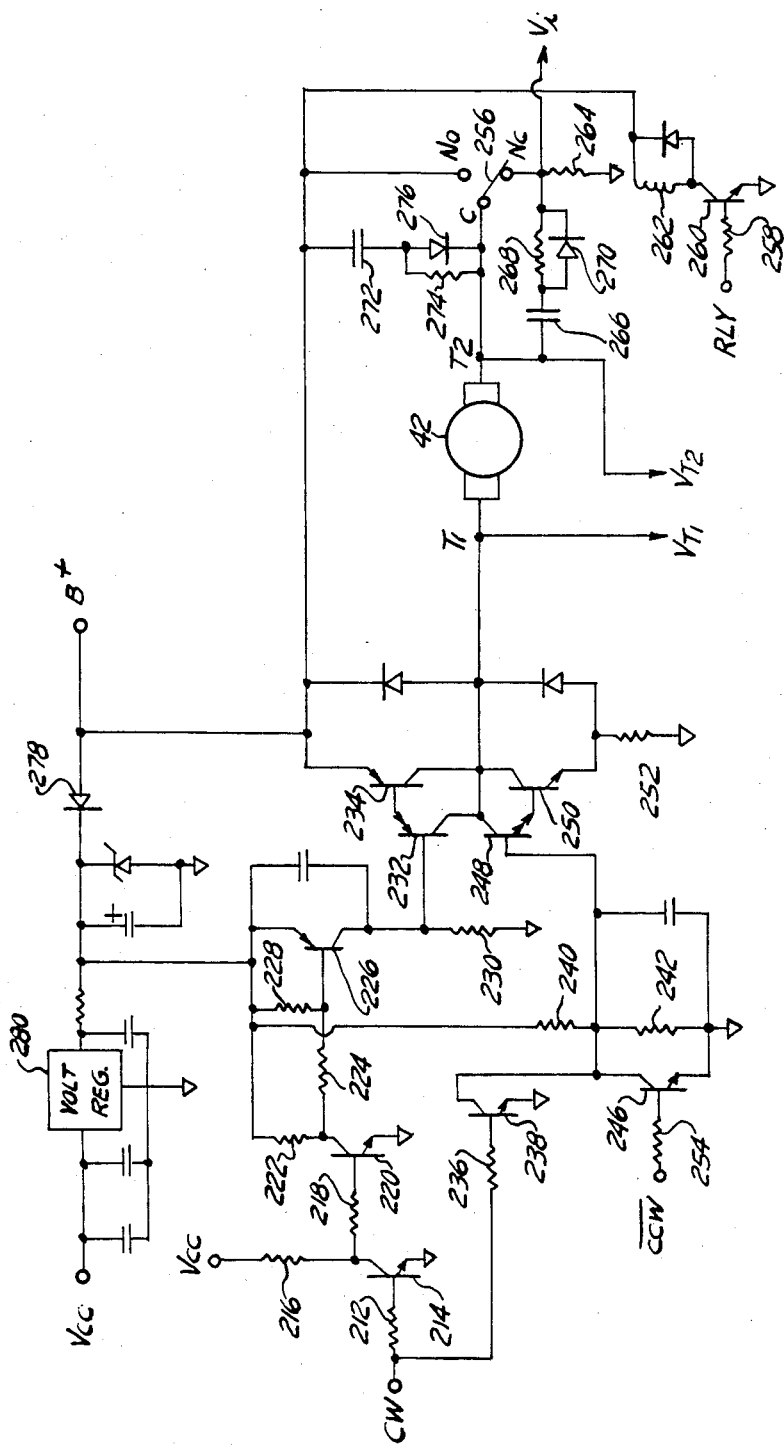
FIG. 9 is a circuit diagram of the motor power control.

Referring now to FIG. 5 there is shown the details of the motor current sensor 44. An operational amplifier 140 receives at its positive input a signal $V_i$ generated across a low resistance 264 in the ground path of the motor 4 as shown in FIG. 9. The negative input of operational amplifier 140 is connected to ground through resistance 142 and its output is connected to the positive input of a comparator 144. The negative input of comparator 144 is from the wiper terminal of a potentometer 146 connected between Vcc and ground. A transistor 148 is connected between Vcc and the wiper terminal of potentometer 146. The base of transistor 148 is connected to the output $Q_1$ of dual timer 84 (FIG. 3) through resistance 150 and receives the mode signal $M_1$.

The output of comparator 144 is the current signal $I_m$ indicative of the motor current exceeding a predetermined value. When the system is in mode M1, the signal M1 is high and transistor 148 is rendered nonconductive. The potential generated at the negative terminal of comparator 144 is then the potential generated at the wiper of potentometer 146 which nominally is about 3 volts. When the input signal $V_i$ is sufficient to cause operational amplifier 140 to generate an output having a potential greater than the signal applied to its negative input, comparator 144 will generate the motor current signal $I_m$. In particular, the signal $I_m$ is indicative of the seat belt being snugged up against the seat's occupant with a predetermined force and is used to terminate or stop the mode signal M1.

In all other modes of operation, the mode signal M1 is a ground signal which renders transistor 148 conductive applying the voltage Vcc to the negative input of comparator 144 inhibiting the generation of the current signal $I_m$.

Figure 6:
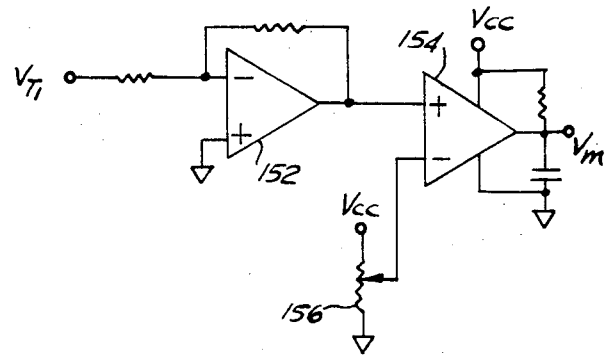

Referring now to FIG. 6 there is shown the terminal voltage sensor 46. An operational amplifier 152 receives at its negative input a voltage signal $V_{T1}$ generated at the terminal T1 of the motor 42. The positive input to operational amplifier 152 is grounded. The output of operational amplifier 152 is connected to the positive input of a comparator 154. The negative input to comparator 154 is from the wiper of a potentometer 156 connected between Vcc and ground. The potentometer 156 is adjusted to provide a potential of approximately 3.5 volts to the negative input of comparator 154. The output of the comparator 154 is the voltage or manual extraction signal $V_m$ indicative of the motor 42 generating a voltage greater than a predetermined value in response to manually extracting or pulling the seat belt from the retractor 14.

Figure 7:
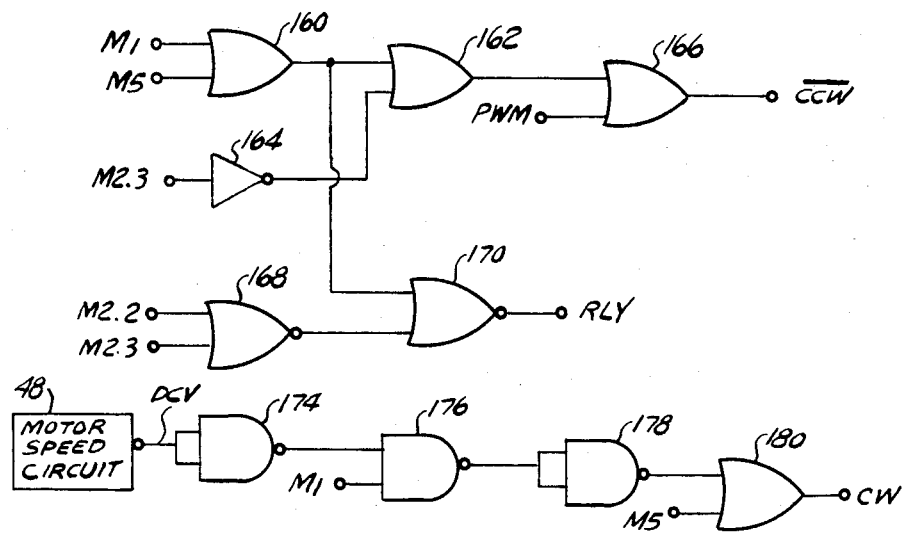
FIG. 7 is a circuit diagram of motor control logic.

The details of the motor control logic are shown on FIG. 7. An OR gate 160 receives the mode signals M1 and M5 output from the Mode select logic circuit 34. The output of OR gate 160 is received at one input of OR gate 162 and an input to NOR gate 170. The mode signal M2.3 is received at the other input of OR gate 162 through inverter 164. The output of OR gate 162 is connected to one input of OR gate 166. The other input of OR gate 166 is the pulse width modulation signal PWM generated by the second timer of dual timer 138 as shown in FIG. 4. The output of OR gate 166 is the motor signal "not counter clockwise" $\overline{CCW}$ applied to motor power control 30.

The mode signals M2.2 and M2.3 are received at the inputs of NOR gate 168. The output of NOR gate 168 is connected to the other input of NOR gate 170. The output of NOR gate 170 is a relay signal RLY which energizes a relay coil 262 to activate a relay switch 256 in the motor power control 30 to switch the second motor terminal T2 between B+ and ground as shall be explained hereinafter with respect to FIG. 9.

A speed control circuit 48 responsive to the voltage applied to the first motor terminal T1 produces a duty cycle signal DCY which is connected to both inputs of NAND gate 174 which functions as an inverter. The output of NAND gate 174 is connected to an input of NAND gate 176 whose output is connected to both inputs of NAND gate 178 which also functions as as an inverter. The mode signal M1 is received at another input of NAND gate 176. The output of NAND gate 178 is connected to one input of OR gate 180. The other input to OR gate 180 is the mode signal M5. The output of OR gate 180 is the "clockwise" signal CW which is applied to the motor power control 30.

The operation of the motor control logic is as follows. When the system is in any mode other than mode M2.3, OR gate 166 will produce the not counter clockwise signal ($\overline{CCW}$) which inhibits the motor power control from actuating the motor to turn in the counterclockwise direction which would unwind or pay out the seat belt from the retractor 14. When the system is in mode M2.3 the signal CCW is terminated effectively grounding motor terminal T1 and NOR gate 170 produces the relay signal RLY which activates relay switch 256 in the motor power control 30 to apply the battery voltage to motor terminal T2. With the battery voltage applied to motor terminal T2 and motor terminal T1 grounded the motor will run in the counter-clockwise direction. The speed at which the motor runs in the counter-clockwise direction is controlled by the pulse width modulation signal PWM received at an input to OR gate 166.

The mode signal M1 will activate OR gate 166 to produce the signal $\overline{CCW}$, activate OR gate 180 to produce the signal CW, and activate NOR gate 170 to terminate the relay signal RLY. The termination of the relay signal RLY will de-energize the relay coil 262 and switch 256 to its normally closed contact. The signal CW will effectively connect motor terminal $T_1$ to the source of electrical power B+ causing the motor run in a clockwise direction to retract the seat belt. The speed of the motor is controlled by speed controller 172 which modulates the output of NAND gate 176 and the output of OR gate 180.

In a similar manner mode signal M5 will cause OR gate 166 to generate the $\overline{CCW}$ signal and OR gate 180 to generate the CW signal and will terminate the relay signal RLY generated by NOR gate 170. The mode signal M5 being applied to an input to OR gate 180 will not be modulated by the duty cycle signal DCY generated by the speed control 48 and full battery power is applied to the motor 42. This will cause the motor 42 to run at maximum speed to take-up as much of the seat belt's slack as possible before the crash loads are applied to the safety restraint system by the occupant. As previously discussed, mode M5 is activated in response to crash sensor 32 detecting a crash situation and that there is at least 20 milliseconds for the motor to remove the slack from the seat belt 10 before the crash forces are applied to the safety restraint system and the vehicle sensitive sensor in the retractor locks up preventing any further extraction of the seat belt from the retractor.

The mode signal M2.2 applied to NOR gate 168 activates the relay in the motor power control prior to the termination of the $\overline{CCW}$ signal by mode signal M2.3. This permits the relay to connect motor terminal T2 to the source of electrical power before motor terminal T1 is closed to ground completing the motor circuit.

Figure 8:
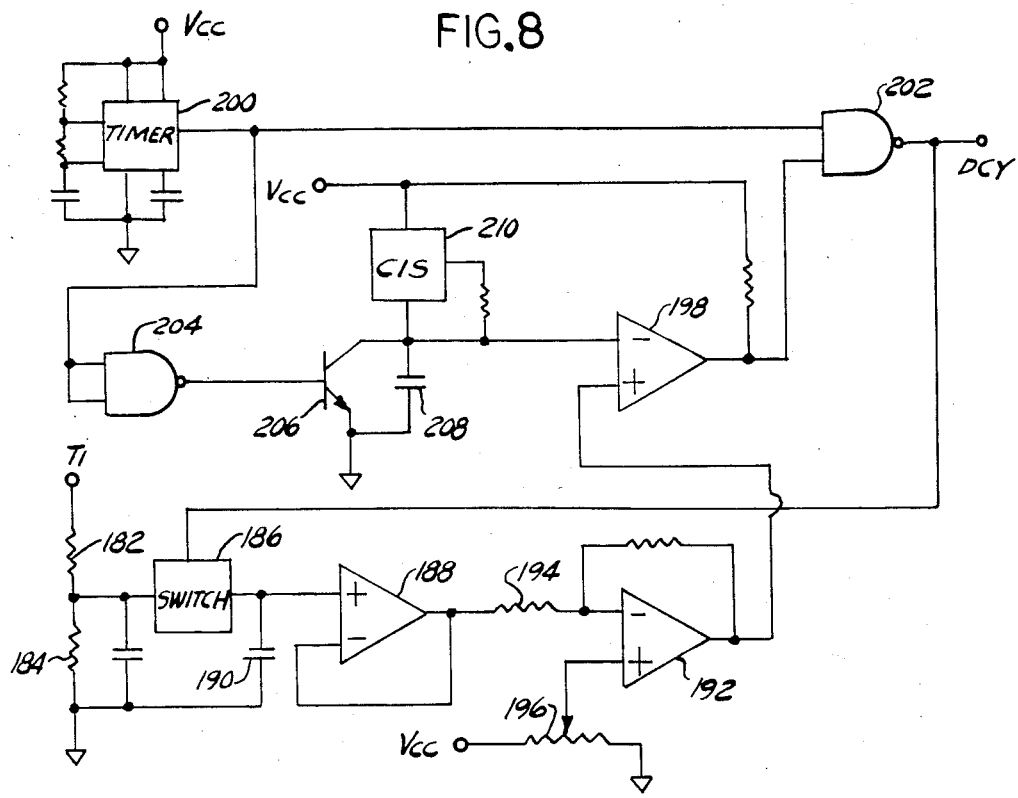
FIG. 8 is a circuit diagram of the speed control circuit.

The details of the speed control circuit 48 are shown on FIG. 8. The voltage at the motor terminal T1 is connected to ground through resistances 182 and 184 which form a voltage divider. The voltage at the junction between resistances 182 and 184 is applied to the positive input of an operational amplifier 188 and capacitor 190 through an analog switch 186 such as analog switch RCA 4066 manufactured by the Radio Corporation of America. The other electrode of capacitor 190 is connected to ground and the output of operational amplifier is connected back to its negative input and to negative input of operational amplifier 192 through a resistance 194. The switch 186, operational amplifier 188 and capacitor 190 form a sample and hold circuit which periodically samples the voltage at the junction between resistances 182 and 184 in response to a positive output of NAND gate 202.

A reference voltage from the wiper of potentiometer 196 connected between Vcc and ground is applied to the positive input of operational amplifier 192. The output of operational amplifier is a difference or error signal which is proportional to the difference between the reference signal generated by potentiometer 196 and the motor voltage signal derived from the sample and hold circuit. This difference signal, which has a predetermined value when the motor is operating at its desired speed, is applied to the positive input of comparator 198.

A timer 200, such as a LM555 timer manufactured by National Semiconductor Incorporated generates a 50 microsecond negative sample pulse at one millisecond intervals. This sample pulse is applied to one input of NAND gate 202 and both inputs of NAND gate 204. The other input to NAND gate 202 is from the output of comparator 198. The output of NAND gate 202 is the duty cycle signal DCY which is applied to the trigger input of the switch 186 and to the inputs of NAND gate 174 in the motor control logic shown on FIG. 7.

The output of NAND gate 204 is applied to the base of transistor 206 which is connected in parallel with capacitor 208. One electrode of capacitor 208 is connected to ground and the other electrode is connected to the collector of transistor 206, the negative input of comparator 198 and a constant current source (CIS) 210. The constant current source 210 may be of any type known in the art such as constant current source LM 334 manufactured by National Semiconductor Incorporated.

The operation of the motor speed control 172 is as follows: The timer 200 produces a negative 50 microsecond pulse at one millisecond intervals. The sample pulse is inverted by NAND gate 202 to produce a trigger signal which activates switch 186 to sample the voltage at the junction between resistances 182 and 184. This voltage is proportional to the voltage present at the motor terminal $T_1$. As discussed relative to the motor control logic 36 shown on FIG. 7, the CW signal which energizes the motor 42 is generated only during the negative or ground portion of the duty cycle signal DCY, therefore, no electrical power is applied to the motor 42 during the sample period. The voltage at motor terminal $T_1$ during the sampling period is the voltage generated by the motor 42 acting as a tachometer which is proportional to the motor's rotational speed.

Operational amplifer 192 generates a difference signal which is proportional to the difference between the reference signal generated by potentiometer 196 and the sampled voltage. This difference signal is applied to the positive input of comparator 198.

The sample pulse inverted by NAND gate 204 activates transistor 206 to discharge capacitor 208 during the sample period. Thereafter, the constant current source 210 recharges capacitor 208 to generate a ramp signal applied to the negative input of comparator 198. Comparator 198 will generate a positive signal as long as the value of the ramp signal is less than the difference signal generated by operational amplifier 192. The positive output of comparator 198 is inverted by NAND gate 202 to generate the duty cycle signal DCY.

If the motor speed is too low, the voltage at motor terminal T1 will be lower and the value of difference signal generated by amplifier 192 will increase thereby increasing negative portion or the motor "on" period of the duty cycle signal DCY. In a like manner if the motor speed is higher than desired, the difference signal generated by amplifier 192 becomes smaller and the motor "on" period of the duty cycle signal will decrease. The reference voltage generated by potentiometer 196 is selected to cause the comparator 202 to generate a duty cycle signal which will cause the motor 42 to run at the desired speed.

The details of the motor power control 30 are shown in FIG. 9. The clockwise or CW signal is received at the base of transistor 214 through a resistance 212. The emitter of transistor 214 is connected to ground and its collector is connected to the regulated voltage supply Vcc through resistance 216 and to the base of transistor 220 through resistance 218. The emitter of transistor 220 is connected to ground while its collector is connected to the battery voltage B+ through resistance 222 and to the base of transistor 226 through resistance 224. The base of transistor 226 is also connected to B+ through resistance 228. The emitter of transistor 226 is connected to B+ and the collector is connected to ground through resistance 230 and to the base of transistor 232. The emitter of transistor 232 is connected to the base of transistor 235 having its emitter connected directly to B+.

The collectors of transistors 232 and 234 are connected to the motor terminal T1 and to the collectors of transistors 248 and 250. The transistors 232 and 234 are connected in the familiar Darlington high gain, high current arrangement which provides electrical power to motor 42 causing it to run in the clockwise direction.

The clockwise CW signal is also applied to the base of transistor 238 through resistance 236. The emitter of transistor 238 is connected to ground and its' collector is connected to the collector of transistor 246 and to the junction of resistances 240 and 242 serially connected between B+ and ground and to the base of transistor 248.

The not counter-clockwise $\overline{CCW}$ signal is received at the base of transistor 246 through resistance 254. The emitter of transistor 246 is connected to ground while its collector is connected to the junction between resistances 240 and 242 and to the base of trasistor 248.

The emitter of transistor 248 is connected to the base of transistor 250. The emitter of transistor 250 is connected to ground through resistance 252. Like transistors 232 and 234, transistors 248 and 250 are connected together in the familiar Darlington configuration and when energized provide a low impedance to ground through resistance 252. Resistance 252 has a value of approxzimate 0.1 ohm and has a negligible effect on the motor current when the terminal T1 is grounded through transistors 248 and 250.

The motor terminal T2 is connected to the pole of a normally closed relay switch 256. Relay switch 256 is activated to switch its pole from its normally close (NC) contact to its normally open contact (NO) by the relay signal RLY applied to the base of transistor 260 through resistor 258. The emitter of transistor 260 is connected to ground and its collector is connected to B+ through coil 262 of relay switch 256.

The normally open (NO) contact of relay switch 256 is connected to B+ while its normally closed (NC) contact is connected to ground through resistance 264.

The motor terminal T2 is also connected to the normally closed (NC) contact of relay switch 256 by means of an arc suppressing circuit comprising capacitance 266, resistance 268 and diode 270. In a like manner motor terminal T2 is connected to the normally open (NO) contact of relay switch 256 through the arc supressing circuit comprising capacitance 272, resistance 274 and diode 276. The resistance 264 is a low impendance resistance having a value of approximately 0.1 ohms. The voltage signal Vi indicative of the current flowing in motor 42 is developed across resistance 264.

The source voltage B+ is also applied to a voltage regulator 280, such a voltage regulator LM 7805 manufactured by National Semiconductor, through diode 278. The output of voltage regulator 280 is the logic source voltage Vcc having a potential of approximately +5 volts.

The operation of the motor power control 30 is as follows: the motor control logic in response to the mode signal M1 generates the clockwise CW signal and not counter clockwise $\overline{CCW}$ signal and terminates the relay signal RLY. The pole of relay switch 256 will remain closed to its normally closed contact grounding motor terminal T2 through resistance 264. The clockwise CW signal will activate transistors 232 and 234 applying battery power B+ to motor terminal T1. The clockwise CW signal will also deactivate transistors 248 and 250 isolating motor terminal T1 from ground. As previously discussed, the clockwise "CW" signal is modulated by the duty cycle signal. During the "OFF" period of the CW signal transistors 232 and 234 are deactivated. The not counter-clockwise $\overline{CCW}$ signal keeps transistors 248 and 250 in the deactivated state, so that the motor 42 will not be dynamically braked by grounding motor terminal T1. In this state the signals $V_{T1}$ and $V_i$ applied to the motor current sensor 44 and terminal voltage sensor 46 and speed control circuit 48 are generated. The mode signal M1 will be terminated either by its associated timer timing out or the motor current sensor 44 generating the signal $I_m$ indicative of the motor current exceeding a predetermined value. The mode select logic 34 will then sequentially generate the mode signals M2.1, M2.2 and M2.3. The mode signal 2.1 is merely a delay and has no affect on the motor control logic 36.

The mode signal M2.2 will cause the mode control logic to generate the relay signal RLY which causes the relay to switch the pole of relay switch 256 to its normally open (N.O.) contact applying B+ to motor terminal T2. Since neither mode signals M1 or M5 are present the clockwise CW signal is terminated, however, the not counter-clockwise $\overline{CCW}$ signal is generated in response to the absence of the mode signal M2.3. The absence of the clockwise CW signal will cause transistors 232 and 234 to be nonconductive (blocked) and the $\overline{CCW}$ signal will cause transistor 248 and 250 to be blocked. Therefore, the motor 42 will not be drawing any current during the period when the pole of switch 256 is switched from its normally closed contact to its normally open contact. This reduces contact arcing and prolongs the life of switch 256.

The mode signal M2.3 is generated after mode signal M2.2. Mode signal M2.3 maintains the generation of the relay signal RLY and terminates the not counter clockwise $\overline{CCW}$ signal. The termination of the not counter-clockwise $\overline{CCW}$ signal energizes transistors 248 and 250 making them conductive and providing a low resistance path to ground through resistance 252. The motor circuit is now completed and the motor will run in a counter-clockwise direction due to the reversal of the potential across motor terminals T1 and T2.

The motor is not energized in mode M3 or Mode M4. The termination of both modes M3 and M4 automatically initiate modes M1, M2.1, M2.2 and M2.3 as described above.

Mode 5 is initiated by the crash sensor 32 detecting actual or imminent crash conditions. The mode signal M5 causes the motor control logic to develop the clockwise CW signal, the not counter-clockwise $\overline{CCW}$ signal and will terminate the relay signal RLY in the event the system is in modes M2.2 or M2.3. The clockwise CW signal generated in response to the mode signal M5 will not be modulated by the duty cycle signal DCY in contrast to the clockwise CW signal generated by the mode signal M1. This will cause full vehicle electrical power to be applied to the motor 42 to retract or take-up most of the seat belt's slack before the crash forces are impressed upon the safety restraint system.

Figure 10:
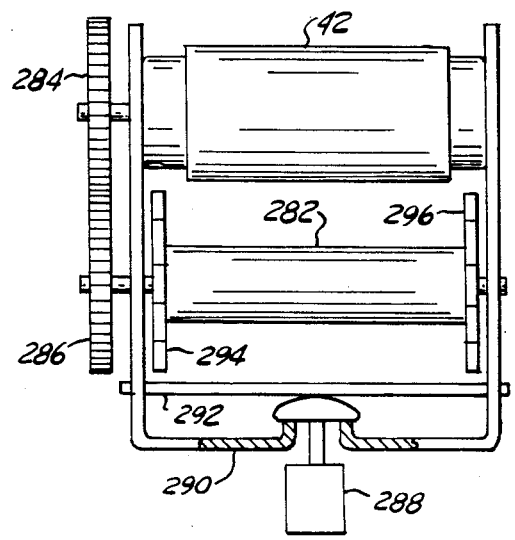
FIG. 10 is an end view of a retractor having the take-up spool driven by the electric motor through an external gear train.

Referring now to FIG. 10, the take-up spool 282 of the seat belt retractor 14 may be driven by the motor 42 through a gear train comprising gears 284 and 286. Gear 284 is connected directly to the output shaft of the motor 42 and gear 286 is connected to the shaft of the retractors' wind-up spool 282. The retractor 14 will include an inertia crash sensor of conventional design which will lock the take-up spool 282 in the event of a crash to prevent the crash forces from playing out the seat belt. Typically, such a crash sensor will comprise a button head weight 288 pivotally attached to the retractor's frame 290. In the event of inertial forces exceeding a predetermined value the button head will displace a pall bar 292 into engagement with the teeth of ratchet wheels 294 and 296 attached to the take-up spool 282. Alternatively, as is known in the art, the crash sensor may clamp the seat belt as it leaves the retractor prohibiting further extraction of the seat belt.

Figure 11:
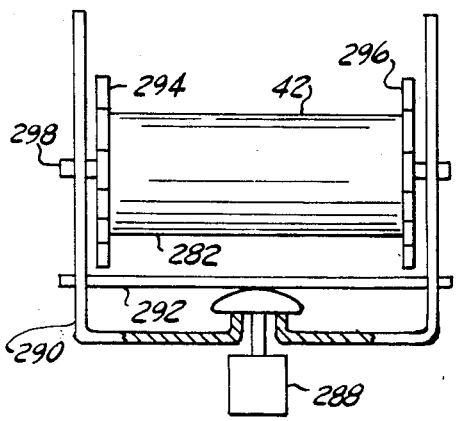
FIG. 11 is an end view of a retractor in which the motor's external housing is the take-up spool.

In an alternate embodiment shown in FIG. 11 the shaft 298 of motor 42 is a non-rotatably attached to the retractor's frame 290 and the outer housing 300 of motor 42 functions as the retractor's spool. The ratchet wheels 294 and 296 are attached to the motor's housing at its opposite ends as shown. The retractor will also include an inertia crash sensor comprising button headed weight 288 and pall bar 282 which perform the same function as described with regards to FIG. 10.

It is not intended that the electrically adjusted safety restraint system be limited to the three point safety restraint system illustrated in the drawings and described herein. Those skilled in the art will recognize that logic control 28 and motor power control 30 may be used to adjust the seat belts in three point safety restraint systems having dual or separate retractors, one for the lap belt and one for the shoulder belt, may be used in two point safety restraint systems having only lap belts or shoulder belts or may be used in passive safety restraint systems.

Having described the electrically actuated safety restraint system, it is acknowledged that those skilled in the art will be able to make changes and/or improvements thereto without departing from the spirit of the invention as described above and set forth in the claims. It is further recognized that the electrically actuated safety restraint system is not limited to automotive vehicles, but may be used on aircraft, boats as well as amusement rides.

What is claimed is:

1. In an electrically adjusted safety restraint system for restraining an occupant in a vehicle's seat having a seat belt with one end attached to a structural member of the vehicle and the other end attached to a seat belt retractor, wherein the improvement comprises:
   an electric motor operatively connected to the retractor for actuating the retractor to retract the seat belt;
   switch means associated with the seat belt having a first state signifying that the seat belt is secured about the occupant and a second state signifying the seat belt is not secured about the occupant;
   a motor current sensor responsive to said first state for generating a snugged-up signal in response to the motor's current exceeding a predetermined value signifying the seat belt has been snugged up to the seat's occupant with a predetermined force;
   logic means for generating a first control signal in response to the state of said switch means, for terminating said first control signal in response to said snugged-up signal and for generating a second control signal in response to the termination of said first control signal; and
   motor power control means for providing electrical power to said motor in response to said first control signal for actuating the retractor to snug up the seat belt and to stow the seat belt when the seat belt is not secured about the occupant and in response to said second control signal for actuating the retractor to unreel a length of seat belt to produce a predetermined slack.

2. The electrically actuated safety restraint system of claim 1 additionally including a crash sensor for generating a crash signal in response to a predetermined change in the acceleration of the vehicle, said logic means for generating a third control signal in response to said crash signal and said motor power control means provides electrical power to said motor in response to said third control signal for activating the retractor to retract the seat belt and take up any slack therein prior to the application of crash loads on the seat belt.

3. The safety restraint system according to claim 2 additionally including lock means in said retractor for inhibiting the extraction of said seat belt in response to said predetermined change in the acceleration of the vehicle.

4. The electrically actuated safety restraint system of claim 2 wherein said motor power control means provides electrical power to said motor to run at a reduced speed in response to said first and second control signals and provides electrical power to said motor to run at a faster speed in response to said third control signal.

5. The safety restraint system of claim 2 wherein said retractor has a take-up spool, said motor rotates said take-up spool to retract and unreel the seat belt.

6. An electrically actuated safety restraint system for restraining the occupant in a vehicle's seat during a crash comprising:
   a seat belt;
   a seat belt retractor attached to one end of said seat belt, said retractor having an electric motor for actuating said retractor to retract and pay out said seat belt, and a lock means for inhibiting the extraction of said seat belt under crash conditions;
   means for securing the other end of said seat belt to the structural member of the vehicle,
   switch means having a first state signifying said other end of said seat belt is secured and a second state signifying said other end of said seat belt is not secured;
   first sensor means responsive to the tension on said seat belt to generate a snugged-up signal when said seat belt is exerting a predetermined force against the occupant; and
   motor control means for energizing said electric motor to actuate said retractor to snug up said seat belt against the occupant in response to said first state, for de-energizing said electrical motor in response to said snugged-up signal, for energizing said electric motor to actuate said retractor to stow said seat belt in response to said second state, and for de-energizing the electric motor in response to said snugged-up signal to energize said motor to rotate in the opposite direction to pay out a predetermined length of said seat belt to relieve the tension of said seat belt of the occupant.

7. The safety restraint system of claim 6 wherein said first sensor means is a motor current sensor generating said snugged-up signal in response to said motor's electrical current exceeding a predetermined value corresponding to a predetermined tension of said seat belt against the occupant.

8. The safety restraint system of claim 6 additionally including a slack sensor responsive to said electric motor for generating a slack signal indicating said seat belt having an excessive slack, and said motor control means includes means responsive to said slack signal for energizing said electric motor to actuate said retractor to snug up said seat belt against the occupant.

9. The safety restraint system of claim 8 wherein said slack sensor is motor voltage sensor for generating said slack signal when the motor voltage exceeds a predetermined value due to the manual extraction of the seat belt from the retractor.

10. The safety restraint system of claim 6 additionally including a crash sensor for generating a crash signal in response to a predetermined rate of change in the vehicle's velocity, said logic means including means responsive to said crash signal for energizing said electric motor to actuate said retractor to retract said seat belt.

11. The safety restraint system of claim 10 wherein said means responsive to said crash signal energizes said motor to run at a rate faster than any other of said included means.

12. An electrically adjusted safety restraint system for restraining an occupant in a vehicle's seat comprising:
   a seat belt having one end attached to a structural member of the vehicle;
   a retractor attached to a structural member of the vehicle, said retractor having a take-up spool attached to the other end of said seat belt, a reversible electric motor for rotating said take-up spool in either direction, and means for inhibiting the extraction of the seat belt from the retractor in response to a first predetermined rate of change in the velocity of the vehicle;
   an adjustable tongue slidably coupled to said seat belt between said one end and said retractor dividing said seat belt into a lap portion and a shoulder portion;
   a buckle for securing said adjustable tongue, said buckle attached to a structural member of the vehicle on the other side of the vehicle's seat, said buckle including a buckle switch having a first state signifying that said adjustable tongue is secured in said buckle and a second state signifying that the adjustable tongue is not secured in said buckle;

a snugged-up sensor for generating a snugged-up signal in response to said first state and the current of said motor exceeding a predetermined value when said shoulder portion of said seat belt is snugged up against the occupant's shoulder with a predetermined force;

a crash sensor for generating a crash signal in response to a second predetermined rate of change in the velocity of the vehicle;

logic means for generating a first signal in response to said buckle switch assuming said first state, for generating said first signal in response to said buckle switch switching from said first state to said second state, for terminating said first signal in response to said snugged-up signal, for generating a second signal having a first fixed duration in response to the termination of said first signal, and for generating a third signal having a second fixed time duration in response to said crash signal;

motor control means for energizing said motor to rotate said take-up spool in a direction to retract said seat belt in response to said first signal, for energizing said motor to rotate said take-up spool in the opposite direction paying out a predetermined length of seat belt in response to said second signal, and for energizing said motor in response to said third signal to rotate said take-up spool to retract said seat belt.

13. The electrically adjusted safety restraint system of claim 12 wherein said logic means comprises:

mode select logic for generating operational mode signals in response to the state of the buckle switch, said snugged-up signal, said slack signal and said crash signal; and motor control logic responsive to said mode signals for generating said first, second, and third signals.

14. The electrically adjusted safety restraint system of claim 13 wherein said mode select logic comprises:

a first timer for generating a first mode signal in response to said buckle switch switching from said first to said second state and switching from said second to said first state, the termination of a third mode signal and the termination of a fourth mode signal, said first timer further responsive to said snugged-up signal to terminate said first mode signal;

a second timer responsive to the termination of said first mode signal to generate a second mode signal;

a third timer for generating said third mode signal for a first predetermined period of time in response to said buckle switch being in said second state and the generation of said slack signal;

a fourth timer for generating said fourth mode signal for a second predetermined period of time in response to said buckle switch being in said second state and the generation of said slack signal; and a fifth timer for generating a fifth mode signal for said second fixed time duration in response to said crash signal.

15. The electrically adjusted safety restraint system of claim 14 wherein said motor control means includes a relay for switching the electrical connection at one terminal of said motor from ground to a supply voltage, said second timer comprising:

a sixth timer for generating a first time delay signal response to the termination of said first mode signal;

a seventh timer for generating a second time delay signal in response to the termination of said first time delay signal; and an eigth timer for generating said second mode signal in response to the termination of said second time delay signal.

16. The electrically adjusted safety restraint system of claim 14 wherein said motor control logic comprises:

means responsive to said first mode signal for generating said first signal;

means responsive to said second mode signal for generating said second signal; and means responsive to said fifth mode signal for generating said third signal.

17. The electrically adjusted safety restraint system of claim 16 additionally including a motor speed sensor for generating a speed control modulation signal in response to the rotational speed of said motor, said means for generating said first signal includes means for modulating said first signal with said speed control modulation signal to control the speed at which said motor rotates said take-up spool to retract said seat belt.

18. The electrically adjusted safety restraint system of claim 17 additionally including means for generating a pay out modulation signal, said means for generating said second signal includes means for modulating said second signal with said pay out modulation signal to control the speed at which said seat belt is unreeled from said retractor.

19. The electrically adjusted safety restraint system of claim 15 wherein said motor control logic means comprises:

means responsive to said first mode signal for generating said first signal;

means responsive to said said second mode signal for generating said second signal;

means responsive to said fifth mode signal for generating said third signal; and means responsive to said second time delay signal, said second mode signal and the absence of said first and fifth mode signals for generating a relay signal activating said relay for switching the electrical connection at one terminal of said motor from ground to a supply voltage.

20. The electrically adjusted safety restraint system of claim 19 having a speed control sensor for generating a speed control modulation signal in response to the rotational speed of said motor and wherein said means for generating said first signal includes means for modulating said first signal with said speed control modulation signal to control the speed at which said motor rotates said take-up spool to retract said seat belt.

21. The electrically adjusted safety restraint system of claim 20 having means for generating a pay out modulation signal, said means for generating said second signal includes means for modulating said second signal with said pay-out modulation signal to control the speed at which said motor rotates said take-up spool to pay out said seat belt.

22. A method for electrically adjusting the tension of a safety restraint system about an occupant of a vehicle's seat, the safety restraint having a seat belt, a motor driven retractor, buckle and a tongue connected to the seat belt received in said buckle, the method comprising the steps of:

detecting the latching of the tongue in the buckle to generate a latched signal;
activating a first timer with said latched signal to generate a first mode signal having a maximum first time duration;
energizing the retractor's motor in response to said first mode signal to snug up the seat belt against the occupant's shoulder;
sensing a predetermined tension on the seat belt to generate a snugged-up signal;
resetting said first timer in response to said snugged-up signal terminating said first mode signal;
detecting the termination of said latched signal to activate said first timer to generate said first mode signal;
detecting excessive slack in the seat belt to generate a slack signal;
sensing the simultaneous occurence of said latch signal and said slack signal to start a second timer to generate a second mode signal having a second time duration;
activating said first timer in response to the termination of said second mode signal to generate said first mode signal;
sensing the occurence of said slack signal in the absence of said latch signal to start a third timer to generate a third mode signal having a third time duration; and
activating said first timer in response to the termination of said third mode signal to generate said first mode signal.

23. The method of claim 22 including the steps of:

activating a fourth timer in response to the termination of said first mode signal to generate a fourth mode signal having a fourth time duration; and
energizing the retractor's motor in response to said fourth mode signal to pay out from the retractor a predetermined length of seat belt.

24. The method of claim 22 further including the steps of:
detecting a rate of change in the vehicle's velocity exceeding predetermined value to generate a crash signal;
energizing a fifth timer in reponse to said crash signal to generate a fifth mode signal;
energizing the retractor's motor in response to said fifth mode signal to retract the seat belt.

25. The method of claim 22 wherein said buckle includes a normal closed electrical switch which opens when said adjustable tongue is latched in said buckle, said step of detecting the latching generates an open circuit signal as said latched signal.

26. The method of claim 22 wherein said step of sensing a predetermined tension on the seat belt senses the motor's current exceeding a predetermined value.

27. The method of claim 22 wherein said step of energizing said motor in response to said first mode signal includes modulating said first mode signal in response to the rotational speed of the motor to control the rotational speed of the motor to a predetermined value.

28. The method of claim 23 wherein said step of energizing said motor in response to said fourth mode signal includes the step of modulating said fourth mode signal to energize said motor to rotate at a reduced speed.

* * * * *